US009292442B2

(12) United States Patent
Speier et al.

(10) Patent No.: US 9,292,442 B2
(45) Date of Patent: Mar. 22, 2016

(54) METHODS AND APPARATUS FOR IMPROVING PERFORMANCE OF SEMAPHORE MANAGEMENT SEQUENCES ACROSS A COHERENT BUS

(71) Applicant: QUALCOMM Incorporated, San Diego, CA (US)

(72) Inventors: Thomas Philip Speier, Raleigh, NC (US); Eric F. Robinson, Raleigh, NC (US); Jaya Prakash Subramaniam Ganasan, Youngsville, NC (US); Thomas Andrew Sartorius, Raleigh, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 13/933,337

(22) Filed: Jul. 2, 2013

(65) Prior Publication Data
US 2014/0310468 A1    Oct. 16, 2014

Related U.S. Application Data

(60) Provisional application No. 61/810,889, filed on Apr. 11, 2013.

(51) Int. Cl.
*G06F 12/08* (2006.01)

(52) U.S. Cl.
CPC ........ *G06F 12/0808* (2013.01); *G06F 12/0811* (2013.01); *G06F 12/0831* (2013.01)

(58) Field of Classification Search
None
See application file for complete search history.

(56) References Cited

U.S. PATENT DOCUMENTS

| 6,073,211 | A  | * | 6/2000 | Cheng et al. ............... 711/122 |
| 6,629,209 | B1 |   | 9/2003 | Arimilli et al. |
| 6,745,294 | B1 |   | 6/2004 | Wilson et al. |
| 7,769,958 | B2 |   | 8/2010 | Kinter et al. |
| 7,984,244 | B2 |   | 7/2011 | Fryman et al. |
| 2003/0131201 | A1 | * | 7/2003 | Khare et al. ............... 711/144 |

(Continued)

FOREIGN PATENT DOCUMENTS

WO    0215021 A1    2/2002

OTHER PUBLICATIONS

International Search Report and Written Opinion for Patent Application No. PCT/US2014/033474, mailed Aug. 8, 2014, 10 pages.
Second Written Opinion for PCT/US2014/033474, mailed Mar. 16, 2015, 6 pages.

(Continued)

*Primary Examiner* — Gary Portka
(74) *Attorney, Agent, or Firm* — Withrow & Terranova, PLLC

(57) ABSTRACT

Techniques are described for a multi-processor having two or more processors that increases the opportunity for a load-exclusive command to take a cache line in an Exclusive state, which results in increased performance when a store-exclusive is executed. A new bus operation read prefer exclusive is used as a hint to other caches that a requesting master is likely to store to the cache line, and, if possible, the other cache should give the line up. In most cases, this will result in the other master giving the line up and the requesting master taking the line Exclusive. In most cases, two or more processors are not performing a semaphore management sequence to the same address at the same time. Thus, a requesting master's load-exclusive is able to take a cache line in the Exclusive state an increased number of times.

20 Claims, 12 Drawing Sheets

(56) References Cited

U.S. PATENT DOCUMENTS

2006/0143408 A1* 6/2006 Sistla ............................ 711/145
2011/0161599 A1   6/2011 Craske

OTHER PUBLICATIONS

International Preliminary Report on Patentability for PCT/US2014/033474, mailed Jul. 20, 2015, 24 pages.

* cited by examiner

| | Processing Agent PX1 | Processing Agent PX2 |
|---|---|---|
| 1 | LDEX A<br>- tags PX1's RG with address A | |
| 2 | - No action | LDEX A<br>- tags PX2's RG with address A |
| 3 | STEX A<br>- executes since PX1's RG is tagged<br>- command issued to un-tag PX2's RG | - un-tags PX2's RG |
| 4 | - No action | STEX A<br>- fails since RG is no longer tagged |

FIG. 2A

| | Processing Agent PX1 | Processing Agent PX2 |
|---|---|---|
| 1 | LDEX A<br>- Obtains line in shared state<br>- tags PX1's RG with address A | PX2's cache holds address A line<br>PX2's RG not tagged<br>PX2 does not change cache state |
| 2 | STEX A<br>- executes since PX1's RG is tagged<br>- command issued to invalidate PX2's address A line | - Invalidates line A in PX2's cache |

FIG. 2B

| | Processing Agent PX1 | Processing Agent PX2 |
|---|---|---|
| 1 | LDEX A<br>- Causes a read exclusive bus cmnd<br>- Obtains line in exclusive state<br>- tags PX1's RG with address A | |
| 2 | -PX1's copy of the line invalidated<br>-PX1 untags RG with address A | LDEX A<br>- Causes a read exclusive bus cmnd<br>- Obtains line in exclusive state<br>- tags PX2's RG with address A |
| 3 | STEX A<br>- Fails since RG is no longer tagged | - No action |
| 4 | LDEX A<br>- Causes a read exclusive bus cmnd<br>- Obtains line in exclusive state<br>- tags PX1's RG with address A | -PX2's copy of line invalidated<br>-PX2 untags RG with address A |
| 5 | - No action | STEX A<br>-Fails since RG is no longer tagged |
| | … Repeat due to live-lock | … Repeat due to live-lock |

FIG. 2D

| | Processing Agent PX1 | Processing Agent PX2 |
|---|---|---|
| 1 | LDEX A hits in its L2 cache<br>-Causes a UpgradePreferExclusive bus cmmd<br>- Obtains line in exclusive state<br>- tags PX1's RG with address A | - PX2's cache holds address A line<br>- PX2's RG not tagged prior to PX1's LDEX A being issued<br>- PX2's address A line is invalidated |
| 2 | STEX A<br>- executes since PX1's RG is tagged and holds the line in an Exclusive state | - No action |

FIG. 4C

METHODS AND APPARATUS FOR IMPROVING PERFORMANCE OF SEMAPHORE MANAGEMENT SEQUENCES ACROSS A COHERENT BUS

PRIORITY APPLICATION

The present application claims priority under 35 U.S.C. §119(e) to U.S. Provisional Patent Application Serial No. 61/810,889 filed on Apr. 11, 2013 and entitled "METHODS AND APPARATUS FOR IMPROVING PERFORMANCE OF SEMAPHORE MANAGEMENT SEQUENCES ACROSS A COHERENT BUS," the contents of which is incorporated herein by reference in its entirety.

FIELD OF THE DISCLOSURE

Embodiments of the present invention relate generally to aspects of semaphore management, and more specifically to semaphore management across a coherent bus.

BACKGROUND

Many portable products, such as cell phones, laptop computers, personal data assistants (PDAs) and the like, utilize a processing system that executes programs, such as communication and multimedia programs. A processing system for such products may include multiple processors, complex memory systems including multi-levels of caches and memory for storing instructions and data, controllers, peripheral devices such as communication interfaces, and fixed function logic blocks configured, for example, on a single chip.

Multiple processors (MPs), such as a dual processor or a quad processor, are generally designed as a shared memory system utilizing a multi-level memory hierarchy. In such a shared-memory MP, data may be organized as private data and shared data. The private data is further organized for use locally by each processor in the MP. The shared data requires a mechanism to efficiently communicate data among the processors and to efficiently maintain coherence of the data between the processors. One mechanism to efficiently communicate data among the processors is to use a coherent bus, within the multi-level memory hierarchy, which supports a coherent protocol to ensure data that is shared is consistent between each of the processors.

For example, a bus may be used at a cache level that requires coherence of the shared data, such as at a level 2 cache position in the shared memory hierarchy. The coherent bus is utilized between each level 2 cache associated with each processor in the MP. Various protocols have been developed to maintain consistency of data that is shared, such as the modified owned exclusive shared Invalid (MOESI) protocol. In the MOESI protocol, each cache line is tagged in such a way as to indicate whether the cache line is present only in the current cache and is dirty (modified), the cache line is present only in the current cache and is clean (exclusive), the cache line may be stored in other caches in the MP and is dirty in the present cache (owned), the cache line may be stored in other caches in the MP and is clean in the present cache (shared), the cache line is invalid in the present cache (invalid). The MOESI states are checked whenever a cache line is written to in order to determine the effect of that write on the corresponding data shared in the multiple caches.

In a multi-processor, specialized instructions are used by each processing agent for semaphore management. Semaphore management often involves a pair of specialized load and store instructions to read a memory location, set a reservation granule, and conditionally write the memory location based on the state of the reservation granule. Systems that maintain cache coherence across a bus have the potential for these semaphore management instructions to result in livelock or poor performance, if two or more processors are competing for the same semaphore.

SUMMARY

Among its several aspects, the present disclosure recognizes that it is desirable to provide more efficient methods and apparatuses for semaphore management across a coherent bus. To such ends, an embodiment of the invention addresses a method for semaphore management across a coherent bus in a multi-processor. A first cache local to a first processor is determined to have missed at a target address in response to a load exclusive instruction issued from the first processor. A read prefer exclusive command is issued on a coherent bus from the first cache to a second cache local to a second processor. In response to the read prefer exclusive command, a reservation granule in the second cache is determined to be in a not tagged state. The cache line in the second cache is invalidated in response to the determination the reservation granule in the second cache for this address is in the not tagged state.

Another embodiment addresses an apparatus for semaphore management across a coherent bus in a multi-processing system. A first cache controller is configured to issue a read prefer exclusive command on a coherent bus from a first cache to a second cache in response to the first cache having a miss for data at a target address provided by a load exclusive instruction, wherein the first cache is coupled to a first processing agent that issued the load exclusive instruction and the second cache is coupled to a second processing agent. A second cache controller is configured to snoop the coherent bus and in response to a snooped read prefer exclusive command and a reservation granule in the second cache being tagged for this target address, ensures a state of the line in the second cache is in a valid and shared state.

Another embodiment addresses a method for semaphore management across a coherent bus in a multi-processor. A first cache local to a first processor is determined to have hit at a target address in response to a load exclusive instruction issued from the first processor, wherein the accessed first cache line is in a shared or owned state. An upgrade prefer exclusive command is issued on a coherent bus from the first cache to a second cache local to a second processor. The second cache is determined to have hit at the target address in response to the upgrade prefer exclusive command, wherein a reservation granule of the accessed second cache line is in a not tagged state. The line requested by the first processor is upgraded to an exclusive state in response to the second cache line being in a shared state.

Another embodiment addresses a computer readable non-transitory medium encoded with computer readable program data and code. A first cache local to a first processor is determined to have missed at a target address in response to a load exclusive instruction issued from the first processor. A read prefer exclusive command is issued on a coherent bus from the first cache to a second cache local to a second processor. The cache line in the second cache is invalidated in response to a reservation granule in the second cache for this address being in a not tagged state.

A further embodiment addresses an apparatus for semaphore management across a coherent bus in a multi-processing system. Means is utilized to issue a read prefer exclusive command on a coherent bus from a first cache to a second cache in response to the first cache having a miss for data at a target address provided by a load exclusive instruction, wherein the first cache is coupled to a first processing agent that issued the load exclusive instruction and the second cache is coupled to a second processing agent. Means is utilized to snoop the coherent bus and in response to a snooped read prefer exclusive command and a reservation granule in the second cache being tagged for this target address, ensures a state of the line in the second cache is in a valid and shared state.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein:

FIG. 2A illustrates a basic example of semaphore management between two processing agents;

FIG. 2B illustrates a first scenario of semaphore management across a coherent bus;

FIG. 2D illustrates a third scenario of semaphore management across a coherent bus illustrating a live-lock situation;

FIG. 4C illustrates an exemplary third semaphore management technique using an upgrade prefer exclusive bus command.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
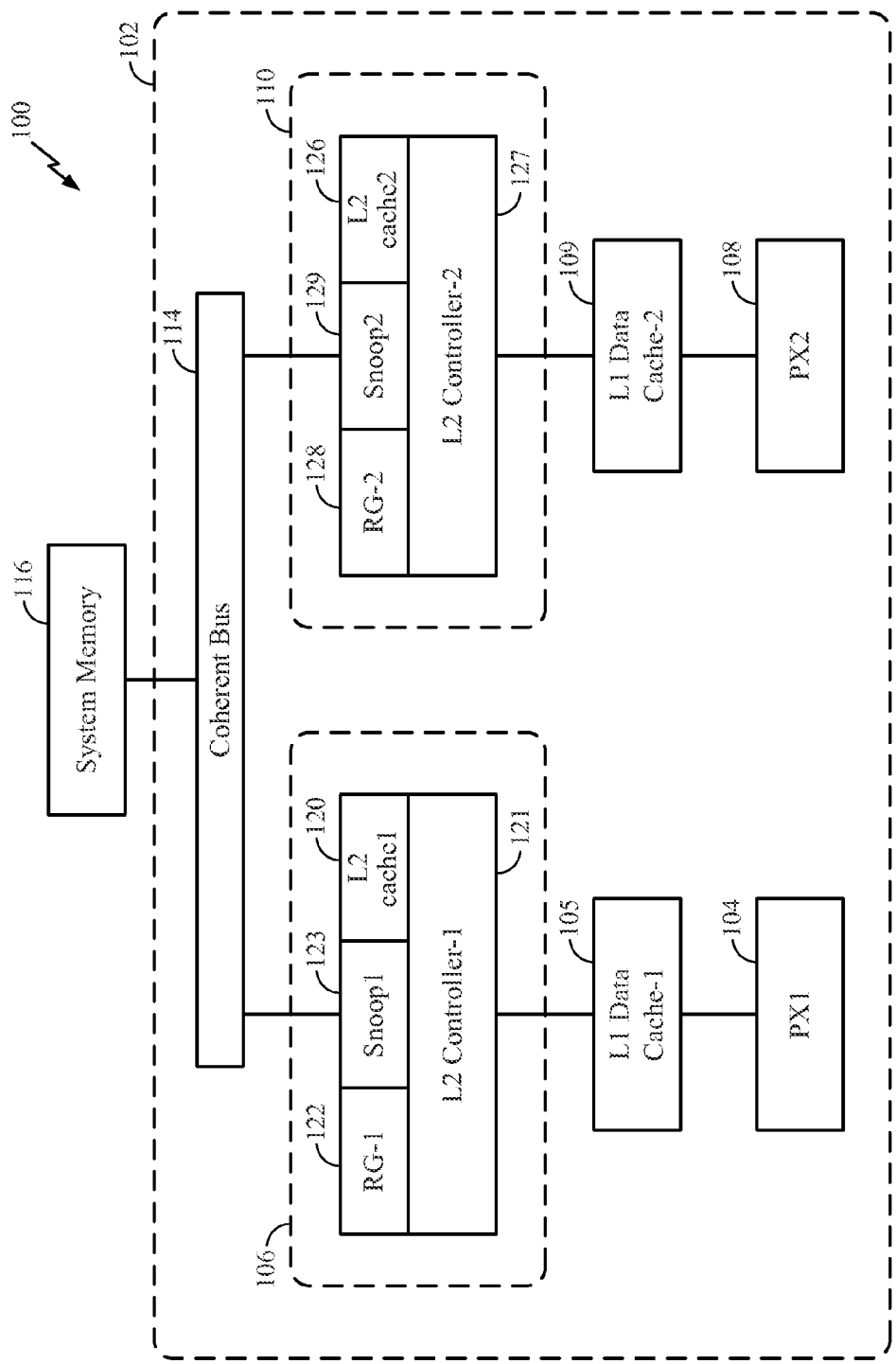
FIG. 1 illustrates a dual core multi-processor (MP) system.

FIG. 1 illustrates a multi-processor (MP) system 100. The MP system 100 comprises a dual core system 102 having a first processing agent (PX1) 104, such as a first core processor, a level 1 data cache-1 (L1Dcache-1) 105, an L2 cache and controller-1 106, a second processing agent (PX2) 108, such as a second core processor, a level 1 data cache-2 (L1 Dcache-2) 109, an L2 cache and controller-2 110, a coherent bus 114, and main memory 116. The L2 cache and controller-1 106 includes an L2 cache1 120, an L2 controller-1 121, a reservation granule-1 (RG-1) 122, and a snoop1 unit 123. The L2cache and controller-2 110 includes an L2 cache2 126, an L2 controller-2 127, a reservation granule-2 (RG-2) 128, and a snoop2 unit 129. A coherent bus may also be used between caches in other levels in the memory hierarchy using similar techniques as described herein. It is noted that the system 100 is not limited to a homogeneous machine as other types of processing agents, such as processors or hardware accelerators, in a heterogeneous machine organization may execute specialized instructions for semaphore management. A reservation granule (RG), such as RG-1 122 and RG-2 128, comprises a program accessible storage location having a valid indication, such as a valid bit, and a tag field for storage of an address. While the RG-1 122 and RG-2 128 are shown in the associated L2 cache controller, the location of the reservation granule is not so limited and may be located elsewhere in the dual core system 102, such as a controller for a different level of the memory hierarchy, for example.

In the dual core MP system 100, specialized instructions are used by each processing agent, such as PX1 104 and PX2 108, for semaphore management. Semaphore management often involves a pair of specialized load and store instructions to read a memory location, set a reservation granule, and conditionally write the memory location based on the state of the reservation granule. These specialized instructions are referred to as load-exclusive (LDEX) and store-exclusive (STEX). The reservation granule (RG) is used to determine if a data value returned for the LDEX has been changed by another processing agent between the execution of the LDEX and the STEX. In other words, the RG is used to allow two discrete instructions to behave together as if they are atomic even though they are individually executed. Specialized commands for efficient semaphore management including a read prefer exclusive command and an upgrade prefer exclusive command are also described in further detail with regard to FIGS. 3A-3C and FIGS. 4A-4C.

The MP system 100 provides for semaphore management across a coherent bus 114. Means, such as the L2 cache and controller-1 106, is utilized to issue a read prefer exclusive command on a coherent bus from a first cache to a second cache in response to the first cache having a miss for data at a target address provided by a load exclusive instruction, wherein the first cache is coupled to a first processing agent that issued the load exclusive instruction and the second cache is coupled to a second processing agent. Means, such as the L2 cache and controller-2 110, is utilized to snoop the coherent bus and respond to a snooped read prefer exclusive command by providing data to the first cache at the target address. In response to a reservation granule in the second cache being tagged for this target address, a state of the line in the second cache ends in a valid state.

For example, the L2 cache and controller-1 106, associated with the first processing agent (PX1) 104 that executes a load exclusive (LDEX) or a store exclusive (STEX), may be configured with decoders for identifying commands on the coherent bus 114. The L2 cache and controller-1 106 is also configured with hardware for identifying a state of an accessed cache line and with comparators for determining whether a current cache line state or current reservation granule (RG) state has changed from a corresponding previous state. The cache line state, such as state of an accessed cache line in the L2 cache1 120, and the state of the RG-1 122 are determined by separate mechanisms that access stored state values in parallel. The determined state values are then combined by logical means to identify whether a bus command needs to be issued. If a bus command needs to be issued an appropriate bus command is selected to issue. While the cache state and the RG state may be checked serially, such an approach may not be as efficient as checking the states in parallel. For example, snoopers, such as snoop1 123 and snoop2 129, operate separately and in parallel by decoding bus commands on the coherent bus 114. The particular operation detected and selected bus command follow operations shown in FIGS. 3A-3C and 4A-4C, which include changing state of a cache line, changing an RG state, and providing a response to the processing agent that executes an LDEX or STEX that causes commands on the coherent bus 114. A further response to the processing agent executing the LDEX may include providing data, such as shown below with, regard to blocks 348, 350, 356, and 358 of FIG. 3B, for example.

FIG. 2A illustrates a basic example of semaphore management 200 between two processing agents, PX1 202 and PX2 203. In a first operation 204, PX1 executes an LDEX A which causes the reservation granule (RG) associated with PX1 to be tagged with the memory address A of the LDEX, In a second operation 205, PX1 takes no action and PX2 also executes an LDEX A which results in the RG associated with PX2 to be tagged with the memory address A. In the multi-processor (MP) environment, a STEX from one processing agent is required to untag another processing agent's RG if tagged with the STEX address. Thus, in a third operation 206, the PX1 executes a STEX A which completes execution since PX1's RG is tagged and a bus command is issued to remove the tag from PX2's RG. In response to the bus command, PX2's RG is untagged. In a fourth operation 207, PX2 attempts to execute a STEX which fails, since PX2's RG is no longer tagged. In a different scenario, if PX2 updated the memory addressed by the PX1's RG before the PX1 executes the STEX, the tag in the PX1's RG is cleared, and PX1's STEX would then not update memory because the RG is no longer tagged. The clearing of the tag indicates to PX1 that the value its LDEX returned is now old and not valid.

Systems that maintain cache coherence across a bus have the potential for these semaphore management instructions to result in live-lock or poor performance. The best performance occurs when the cache associated with the processor executing the semaphore management instruction contains the cache line in either the modified or exclusive states when the STEX executes. If the cache line addressed by the STEX is in any other state, then a bus request must be made to obtain the line in the modified or exclusive state prior to the STEX being allowed to complete.

FIG. 2B illustrates a first scenario of semaphore management 220 across a coherent bus. For this first scenario, processing agents PX1 202 and PX2 203 are not trying to access the same semaphore at the same time and PX2 holds the cache line including data at address A. Also, PX2's RG is not tagged. In a first operation 224, PX1 executes an LDEX A and obtains the line in a shared state. PX1's RG is then tagged with address A. Since the line is in a shared state, PX2's copy of the line must be invalidated in order to change PX1's line to an exclusive state. In a second operation 225, PX1 issues a STEX A which causes a bus command to be issued to invalidate the PX2's line. The command issued to invalidate PX2's line with address A causes additional latency when PX1 is trying to acquire the semaphore.

Figure 2C:
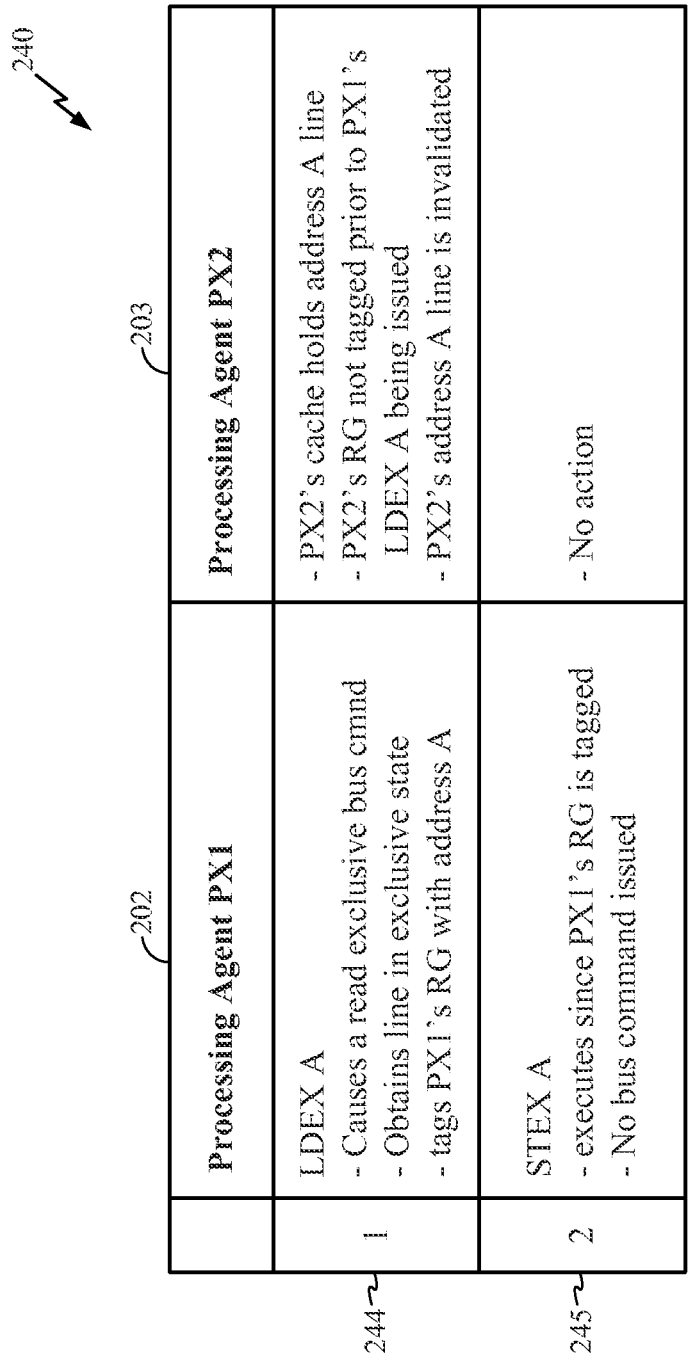
FIG. 2C illustrates a second scenario of semaphore management across a coherent bus.

FIG. 2C illustrates a second scenario of semaphore management 240 across a coherent bus. For this second scenario, PX1 202, PX2 203, and a coherent bus are configured to obtain a line exclusive upon executing an LDEX. PX2 holds the cache line including data at address A. Also, PX2's RG is not tagged prior to PX1's LDEX A being issued. In a first operation 244, PX1 executes an LDEX A which causes a read exclusive bus command to be issued and obtains the line in an exclusive state. Since the line is in an exclusive state, PX2's copy of the line is invalidated and PX1's RG is then tagged with address A. In a second operation 245, PX1 issues a STEX A which completes execution since PX1's RG is tagged, and does not need to issue a bus command because PX1's LDEX already obtained line A in the exclusive state. While this semaphore management technique 240 helps performance by not requiring PX1's STEX A to make an additional bus command before completing execution, it can lead to a live-lock situation as described with regard to FIG. 2D.

FIG. 2D illustrates a third scenario of semaphore management 260 across a coherent bus illustrating a live-lock situation. For this third scenario, PX1 202, PX2 203, and a coherent bus are configured to obtain a line exclusive upon executing an LDEX. PX1 and PX2 both hold copies of the cache line including data at address A. In a first operation 264, PX1 executes an LDEX A which causes a read exclusive bus command to be issued and obtains the line in an exclusive state. Since the line is in an exclusive state, PX2's copy of the line is invalidated and PX1's RG is then tagged with address A. If PX2's RG was tagged, it is untagged. In a second operation 265, PX2 executes an LDEX A which causes a read exclusive bus command to be issued and obtains the line in an exclusive state. Since the line is in an exclusive state, PX1's copy of the line is invalidated, PX1's RG is untagged, and PX2's RG is then tagged with address A. In a third operation 266, PX1 issues a STEX which fails since its RG is no longer tagged causing the LDEX/STEX process to be repeated. In a fourth operation 267, PX1 executes an LDEX A which causes a read exclusive bus command to be issued and PX1 obtains the line in an exclusive state. Since the line is in an exclusive state, PX2's copy of the line is invalidated, PX1's RG is then tagged with address A, and PX2's RG is untagged. In a fifth operation 268, PX2 issues a STEX which fails since its RG is no longer tagged causing the LDEX/STEX process to be repeated. In a sixth operation 269 and continuing, the LDEX/STEX process in both PX1 and PX2 are repeated due to the live-lock situation.

To ensure a live-lock situation does not occur, it is noted that the STEX operation is always preceded by an LDEX operation and thus, the LDEX can be used as a hint to obtain the line in a modified or exclusive state in anticipation of the STEX executing. However, an implementation cannot demand the line in a modified or exclusive state upon execution of the LDEX as indicated by the operations of FIGS. 2C and 2D. Such an approach could cause a live-lock if two processors were competing for the same semaphore, as shown in FIG. 2D. To avoid this live-lock situation, previous implementations have allowed the LDEX to obtain the line in the exclusive state if all other caches have the line invalid, but require the line to be taken shared if any other cache has the line in a state other than invalid. In the case where the line is taken shared by the LDEX executing processing agent, the STEX must then make an additional bus request to invalidate the other cache's shared copy of the line as shown in FIG. 2B, which causes a loss in performance.

The dual core system 102 is configured to execute software instructions that are stored in a non-transitory computer-readable medium, such as associated with the system memory 116, and that are executable to cause a computer, such as the first processing agent (PX1) 104 and the second processing agent (PX2) 108, to execute a program to operate as illustrated in FIGS. 3A-3C and 4A-4C. The PX1 104 and PX2 108 are configured to execute the software instructions that are accessed from the different levels of cache memories, 105, 120, 109, and 126, and the system memory 116.

Figure 3A:
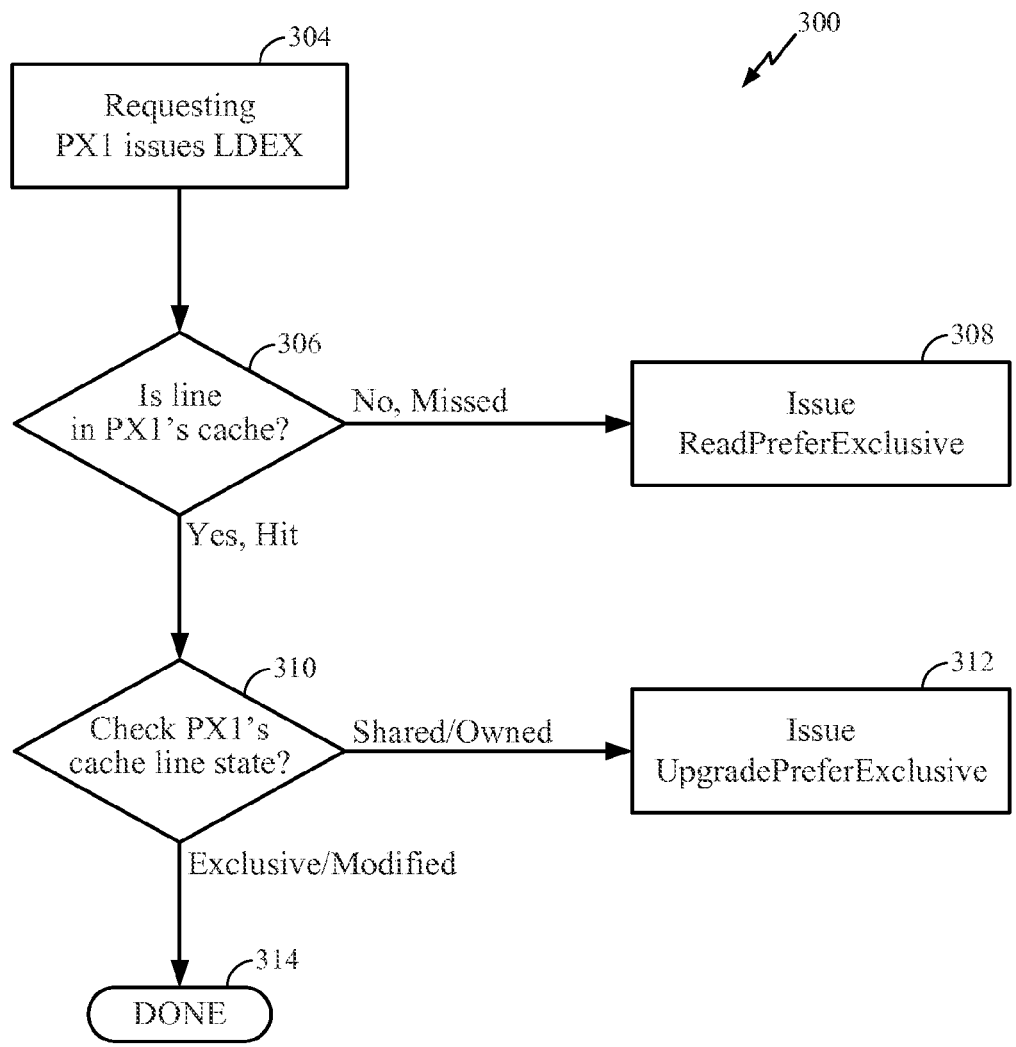
FIG. 3A illustrates a semaphore management process having support for efficient live-lock avoidance.

FIG. 3A illustrates a semaphore management process 300 having support for efficient live-lock avoidance. To avoid live-lock and the associated loss in performance, the coherent bus protocol is modified to include new commands that are issued, such as at block 308, to cause the read prefer exclusive command to issue and at block 312 to cause the upgrade prefer exclusive command to issue. The commands at blocks 308 and 312 operate in response to a cache access associated with block 306, a cache line state associated with block 310, and states of reservation granules (RGs) built into the cache controller, such as L2 cache and controller-1 106 and L2 cache and controller-2 110.

The process 300 begins at block 304, where a requesting core processing agent, such as PX1 104, issues an LDEX A instruction. At block 306, the cache, such as the L2 cache1 120 of FIG. 1, associated with the requesting PX1 determines if the line having data at address A is in the cache. If the line is not present in the cache, the process 300 proceeds to block 308. At block 308, a coherent bus controller, such as the L2 cache controller-1 121 associated with the PX1, issues a read prefer exclusive command on the coherent bus 114. Returning to block 306, if the line is present in the cache, such as indicated by a hit in the cache, the process 300 proceeds to block 310. At block 310, a determination is made whether PX1's cache line state indicates shared, owned, exclusive, or modified. If the state is shared or owned, the process 300 proceeds to block 312. At block 312, the coherent bus controller, such as the L2 cache controller-1 121 associated with the PX1, issues an upgrade prefer exclusive command on the coherent bus 114. Returning to block 310, if the state is exclusive or modified, the process 300 proceeds to block 314 where the process associated with PX1's issue of the LDEX A instruction is completed.

Figure 3B:
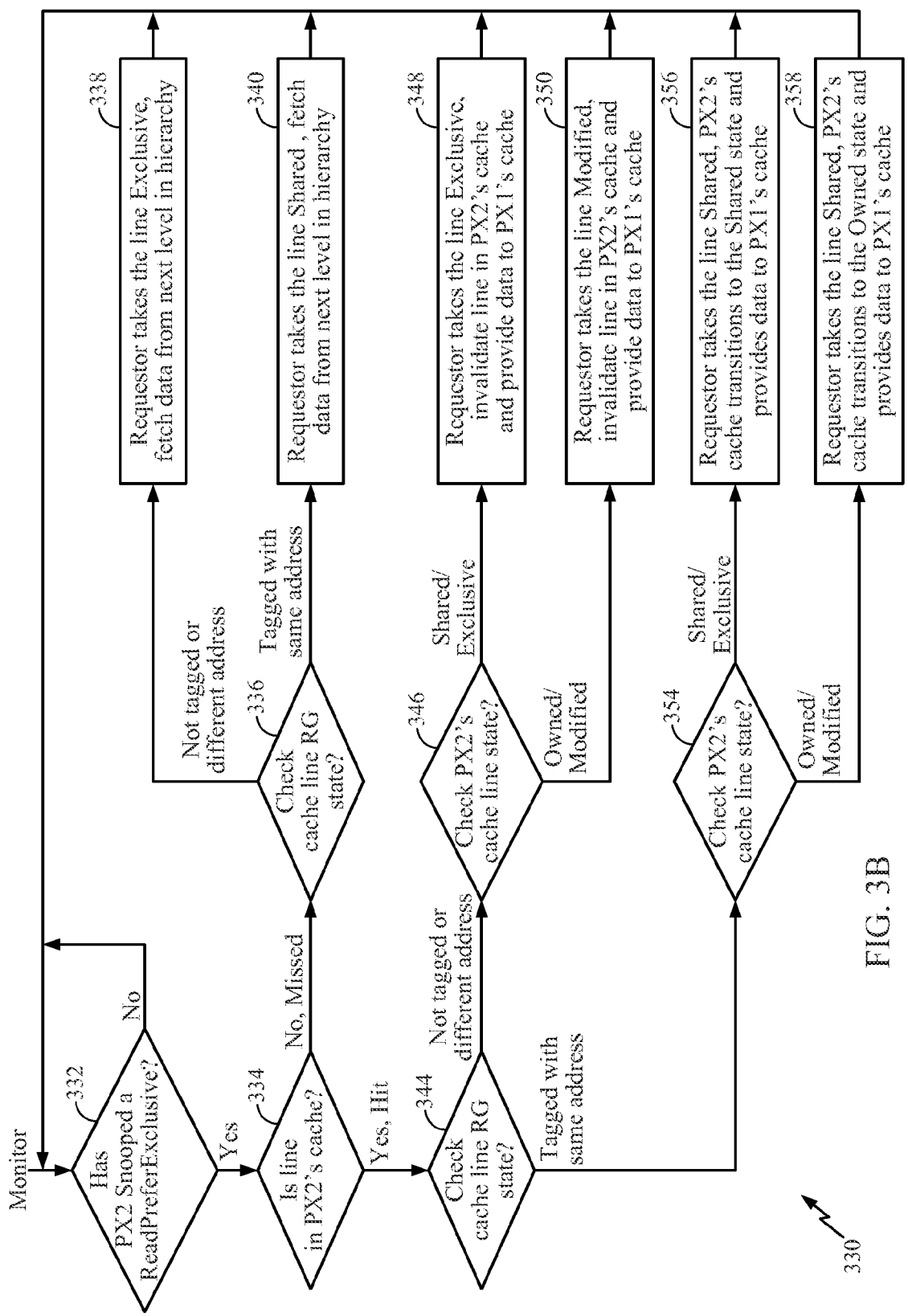
FIG. 3B illustrates a read prefer exclusive semaphore management process.

FIG. 3B illustrates a read prefer exclusive semaphore management process 330. An RG is tagged with the target cache line address in response to an LDEX instruction. A STEX instruction only updates memory if the RG, for the STEX-executing processing agent, is tagged at the time that the STEX instruction was issued for execution. A read prefer exclusive operation is used as a hint to other caches in the MP that the requesting master is likely to store to the cache line, and, if possible, each of the other caches should invalidate the line to allow the requesting master to transition to the exclusive state. In most cases, this will result in the other masters invalidating the line, which may also be referred to as giving up the line, and the requesting master taking the line exclusive. It is noted that a cache line may be marked shared even if data in that line is missing in the second cache. The cache line in the first cache is marked as shared because the second cache still has its RG tagged with the target address. Although the second cache does not have the line valid in its cache, the second cache's RG is still valid and the first cache takes the line shared to remember that there is an RG that is tagged in the second cache. The STEX instruction must still broadcast to un-tag the RG in the second cache even though the second cache does not have the line valid in its cache.

The only time another cache is unable to give up the line is when the other cache is itself performing a semaphore management sequence and the other cache's RG is tagged with the same address as this could lead to the live-lock. In most cases, multiple processors are not performing a semaphore management sequence for the same address at the same time. As a result, this embodiment could significantly increase the number of times that a requesting master's LDEX is able to take the line in the exclusive state which increases performance in each processor of the MP.

The process 330 begins at block 332 from a monitor that determines whether a read prefer exclusive command was detected on a coherent bus. Upon the command being detected, also referred to as snooped, from the coherent bus 114 by a snooper operating for PX2, the process 330 proceeds to block 334. At block 334, a determination is made whether the line associated with the LDEX instruction issued at block 304 is in the PX2's cache. If the determination is that the line is not in the PX2's cache, such as indicated by a miss in the cache, the process 330 proceeds to block 336. At block 336, a determination is made whether the cache line reservation granule (RG) associated with PX2 is tagged with the same address A of the LDEX instruction or if it. is not tagged or is tagged with an address different than address A. If the line is not tagged or is tagged with an address different than A, the process 330 proceeds to block 338. At block 338, the requester, in this case PX1, takes the line exclusive and the data is fetched from the next level in the memory hierarchy, such as from an L3 cache. The process 330 then returns to block 332. Returning to block 336, if the line is tagged with the same address, the process 330 proceeds to block 340. At block 340, the requester, in this case PX1, takes the line shared and the data is fetched from the next level in the memory hierarchy. The process 330 then returns to block 332.

Returning to block 334, if the determination is that the line is in PX2's cache, such as indicated by a hit in the cache, the process 330 proceeds to block 344. At block 344, a determination is made whether the cache line reservation granule (RG) associated with PX2 is tagged with the same address A of the LDEX instruction or if it is not tagged or is tagged with an address different than address A. If the line is not tagged or is tagged with an address different than A, the process 330 proceeds to block 346. At block 346, a determination is made whether the PX2 cache line state is shared or exclusive or if the PX2 cache line state is owned or modified. If the PX2 cache line state is shared or exclusive, the process 330 proceeds to block 348. At block 348, the requester PX1 takes the line exclusive, invalidates the line in the PX2's cache, and provides the accessed data to PX1's cache. The process 330 then returns to block 332. Returning to block 346, if the PX2 cache line state is owned or modified, the process 330 proceeds to block 350. At block 350, the requester PX1 takes the line modified, invalidates the line in the PX2's cache, and provides the accessed data to PX1's cache. The process 330 then returns to block 332.

Returning to block 344, if the line is tagged with the same address, the process 330 proceeds to block 354. At block 354, a determination is made whether the PX2 cache line state is shared or exclusive or if the PX2 cache line state is owned or modified. If the PX2 cache line state is shared or exclusive, the process 330 proceeds to block 356. At block 356, the requester PX1 takes the line shared, the PX2's cache if in the exclusive state, transitions to the shared state, if in the shared state, remains in the shared state, and provides the accessed data to PX1's cache. The process 330 then returns to block 332. Retaining to block 354, if the PX2 cache line state is owned or modified, the process 330 proceeds to block 358. At block 358, the requester PX1 takes the line shared, the PX2's cache if in the modified state, transitions to the owned state, if in the owned state, remains in the owned state, and provides the accessed data to PX1's cache. The process 330 then returns to block 332.

Figure 3C:
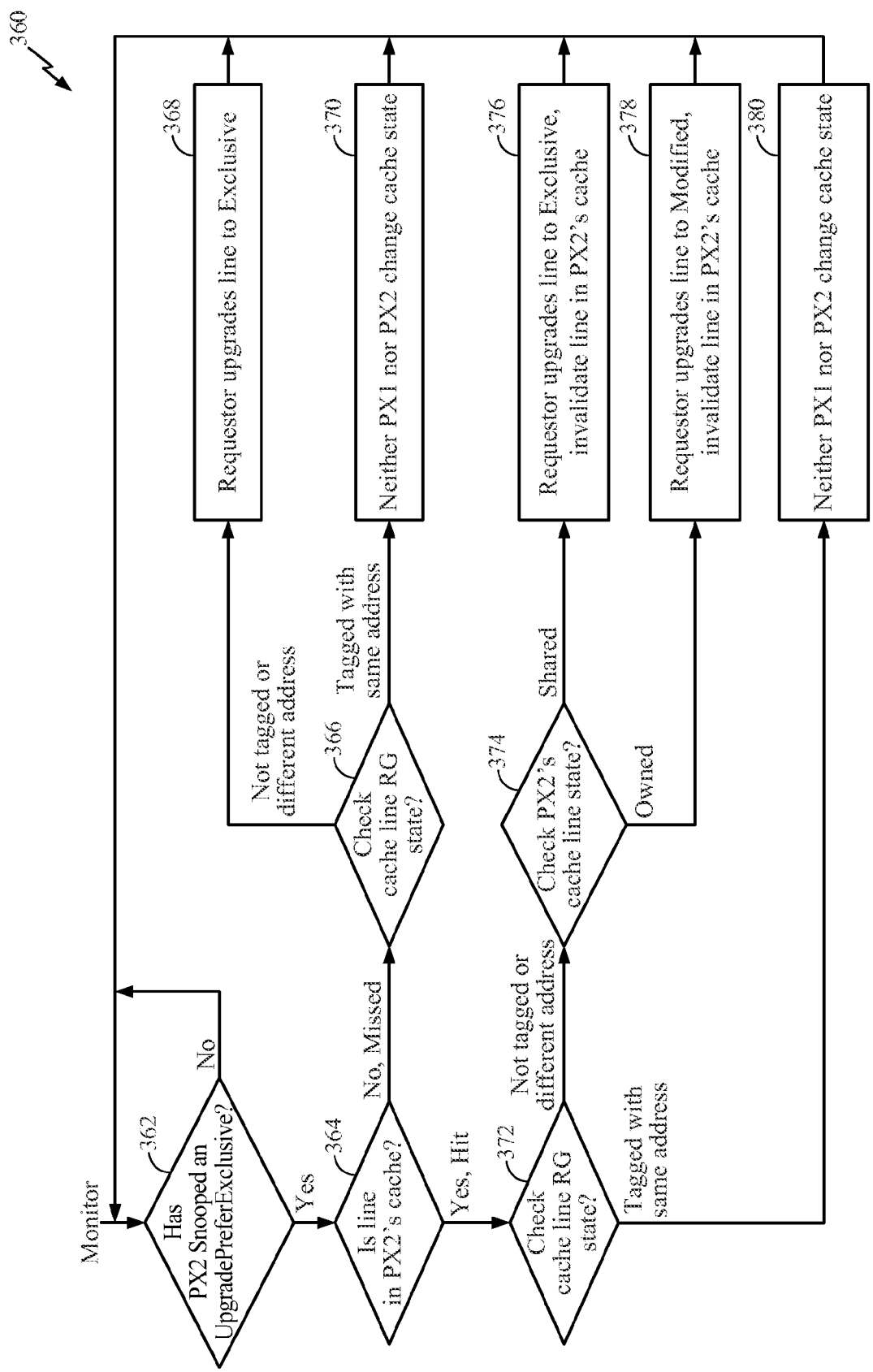
FIG. 3C illustrates an upgrade prefer exclusive semaphore management process.

FIG. 3C illustrates an upgrade prefer exclusive semaphore management process 360, The process 360 begins at block 362 from a monitor that determines whether an upgrade prefer exclusive command was detected on a coherent bus. Upon the command being detected, also referred to as snooped, from the coherent bus 114 by a snoop unit or snooper operating for PX2, the process 360 proceeds to block 364. At block 364, a determination is made whether the line associated with the LDEX instruction issued at block 304 is in the PX2's cache. If the determination is that the line is not in the PX2's cache, such as indicated by a miss in the cache, the process 360 proceeds to block 366. At block 366, a determination is made whether the cache line reservation granule (RG) associated with PX2 is tagged with the same address A of the LDEX instruction or if it is not tagged or is tagged with an address different than address A. If the line is not tagged or is tagged with an address different than A, the process 360 proceeds to block 368. At block 368, the requester, in this case PX1, upgrades the line state to exclusive. The process 330 then returns to block 332. Returning to block 366, if the line is tagged with the same address, the process 360 proceeds to block 370. At block 370, no action is taken and neither PX1 nor PX2 change cache state. The process 330 then returns to block 332.

Returning to block 364, if the determination is that the line is in the PX2's cache, such as indicated by a hit in the cache, the process 360 proceeds to block 372. At block 372, a determination is made whether the cache line reservation granule (RG) associated with PX2 is tagged with the same address A of the LDEX instruction or if it is not tagged or is tagged with an address different than address A. If the line is not tagged or is tagged with an address different than A, the process 360 proceeds to block 374. At block 374, a determination is made whether the PX2 cache line state is shared or if the PX2 cache line state is owned. If the PX2 cache line state is shared, the process 360 proceeds to block 376. At block 376, the requester PX1 upgrades the line to an exclusive state and invalidates the line in the PX2's cache. The process 360 then returns to block 362. Returning to block 374, if the PX2 cache line state is owned, the process 360 proceeds to block 378. At block 378, the requester PX1 upgrades the line to a modified state and invalidates the line in PX2's cache. The process 360 then returns to block 362.

Returning to block 372, if the line is tagged with the same address, the process 360 proceeds to block 380, At block 380, no action is taken and neither PX1 nor PX2 change cache state. The process 360 then returns to block 362.

In an alternative embodiment, the read prefer exclusive command and the upgrade prefer exclusive command may be determined by including an appropriate attribute in an existing bus command. For example, to provide the function of the read prefer exclusive command, an attribute may be added to a read command that indicates a requesting processor might require the line exclusive. In most cases, the other processing agents would release the cache line in response to the attribute allowing the requesting agent to take the line exclusive. It is noted that a read command with an attribute set to indicate a requesting processor might require the line in an exclusive state may also be referred to as a read prefer exclusive command. Also, the function of the upgrade prefer exclusive command may be implemented by including an attribute in an upgrade command that indicates a requesting processor might require the line exclusive.

Figure 4A:
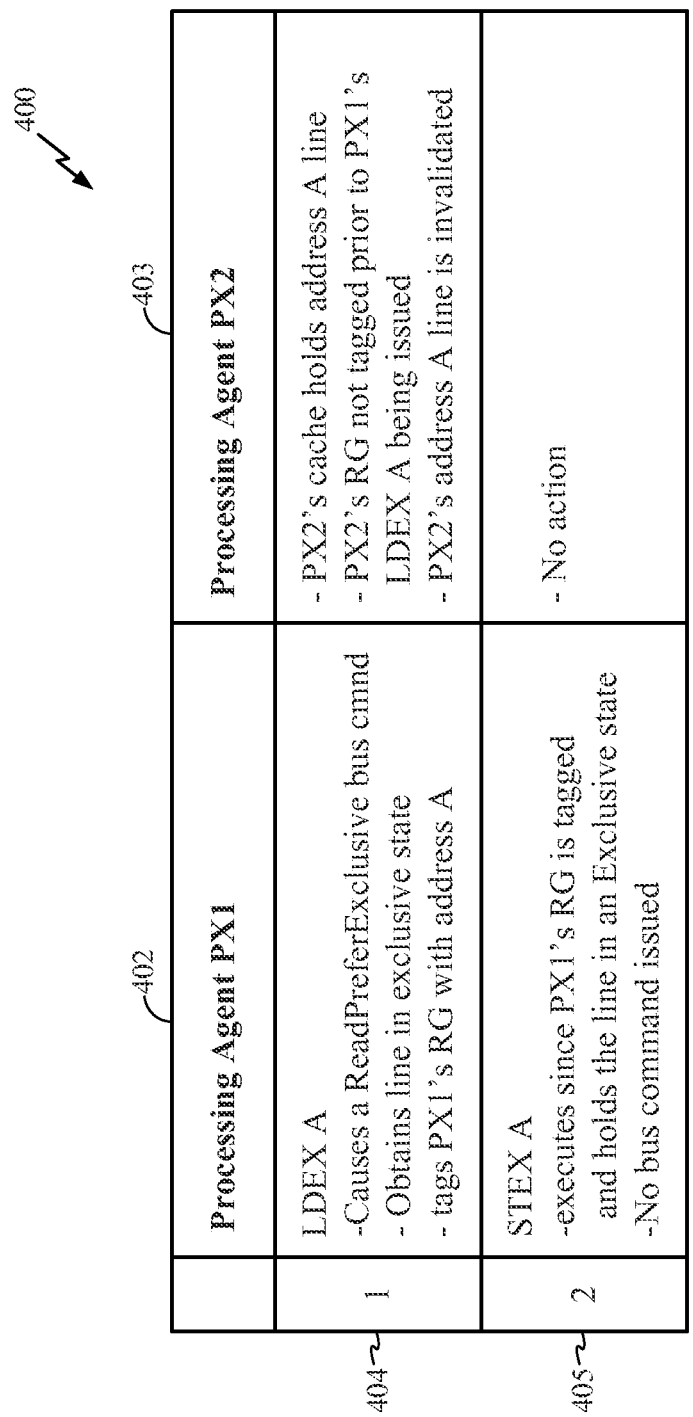
FIG. 4A illustrates an exemplary first semaphore management technique using a read prefer exclusive bus command.

FIG. 4A illustrates an exemplary first semaphore management technique 400 using a read prefer exclusive bus command. For this first technique, PX1 402, PX2 403, and a coherent bus are configured to opportunistically obtain a line exclusive upon executing an LDEX, when the LDEX by itself cannot demand the line exclusive. PX2 holds the cache line including data at address A. Also, PX2's RG is not tagged prior to PX1's LDEX A being issued. In a first operation 404, PX1 executes an LDEX A which causes a read prefer exclusive bus command to be issued and obtains the line in an exclusive state. Since the line is in an exclusive state, PX2's copy of the line is invalidated and PX1's RG is then tagged with address A. In a second operation 405, PX1 issues a STEX A which completes execution since PX1's RG is tagged and no additional bus command is issued. No further action is required by PX2. The semaphore management technique 400 helps performance by not requiring PX1's STEX A to make an additional bus command before completing execution.

Figure 4B:
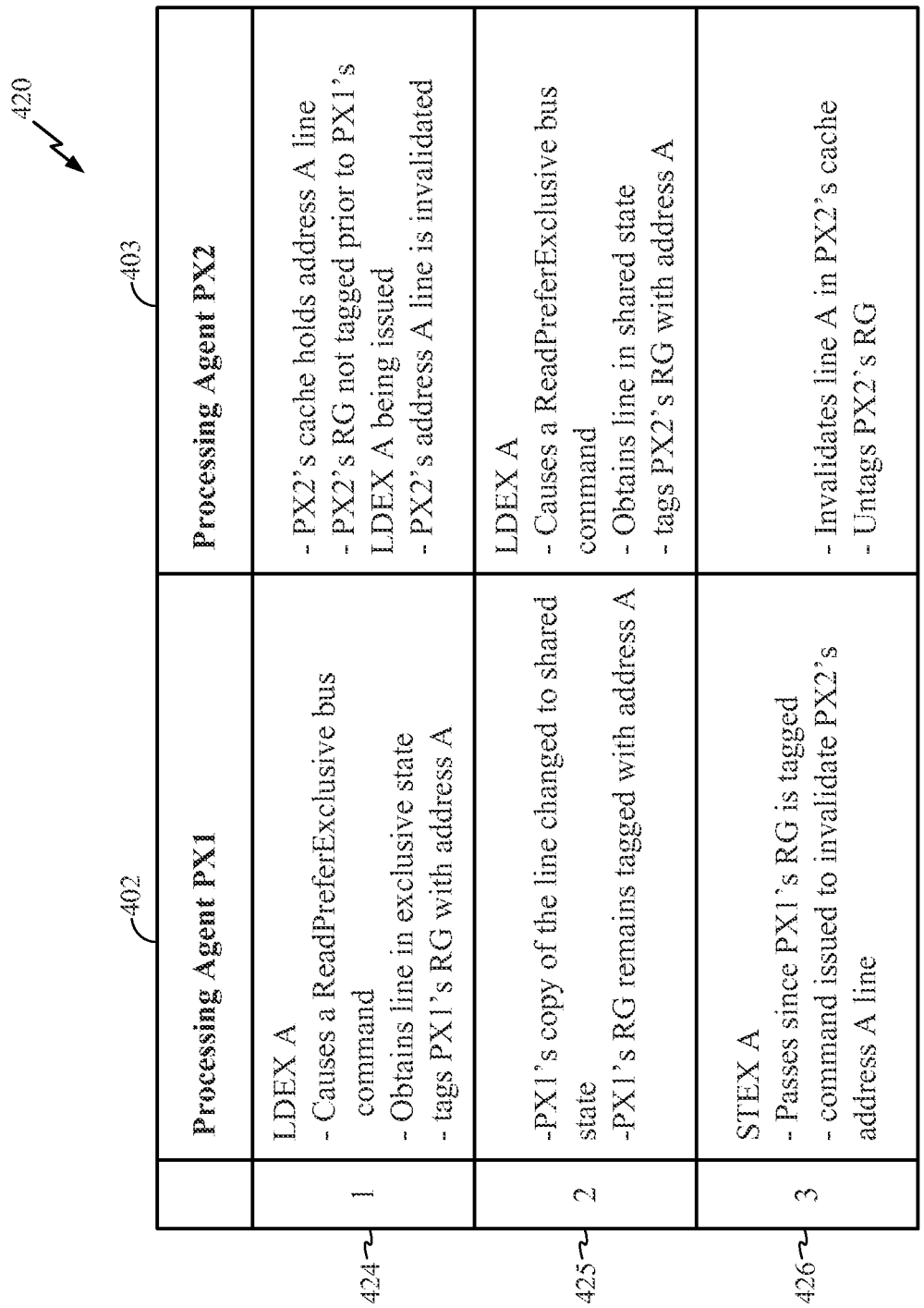
FIG. 4B illustrates an exemplary second semaphore management technique using the read prefer exclusive bus command.

FIG. 4B illustrates an exemplary second semaphore management technique 420 using the read prefer exclusive bus command. For this second semaphore management technique 420, PX1 402, PX2 403, and a coherent bus are configured to obtain a line exclusive upon executing an LDEX. PX1 and PX2 both hold copies of the cache line in their associated cache including data at address A. PX2's RG is not tagged prior to PX1 issuing an LDEX A. In a first operation 424, PX1 executes an LDEX A which causes a read prefer exclusive bus command to be issued and obtains the line in an exclusive state. Since the line is in an exclusive state, PX2's copy of the line is invalidated and PX1's RG is then tagged with address A. In a second operation 425, PX2 executes an LDEX A which causes a read prefer exclusive bus command to be issued and obtains the line in a shared state. Since the line is in a shared state, PX1's copy of the line is changed to a shared state, PX1's RG remains tagged with address A, and PX2's RG is tagged with address A. In a third operation 426, PX1 issues a STEX A which causes an additional bus command to be issued to invalidate PX2's line and untag PX2's RG. The STEX completes execution since PX2's line is invalidated and PX1's RG is tagged. The command issued to invalidate PX2's line with A causes additional latency when PX1 is trying to acquire the semaphore. However, there is no live-lock. The additional bus command is required only for the relatively uncommon case where two processing agents are trying to obtain the same semaphore at the same time.

FIG. 4C illustrates an exemplary third semaphore management technique 440 using an upgrade prefer exclusive bus command. For this first technique, PX1 402, PX2 403, and a coherent bus are configured to opportunistically obtain a line exclusive upon executing an LDEX, when the LDEX by itself cannot demand the line exclusive. PX2 holds the cache line including data at address A. Also, PX2's RG is not tagged prior to PX1's LDEX A being issued. In a first operation 444, PX1 executes an LDEX A which hits in its L2 cache, causes an upgrade prefer exclusive bus command to be issued, and obtains the line in an exclusive state. Since the line is in an exclusive state, PX2's copy of the line is invalidated and PX1's RG is then tagged with address A. In a second operation 445, PX1 issues a STEX A which completes execution since PX1 holds the line in an exclusive state and PX1's RG is tagged. No further action is required by PX2. The semaphore management technique 440 helps performance by not requiring PX1's STEX A to make an additional bus command before completing execution.

In an alternative embodiment for blocks 348, 350, 356, and 358, rather than have the data provided by the level 2 cache associated with PX2, data could be provided by the next level cache in the memory hierarchy or from the main system memory. In such a case, the cache line invalidation indicated in blocks 348 and 350 would occur regardless of where the data came from.

While FIG. 1 illustrates a system with two processing agents, PX1 104 and PX2 108, the embodiments described herein are also applicable to systems having three or more processing agents. In this further embodiment, each additional L2 cache and controller snoops a coherent bus between the plurality of cache controllers and upon detecting a bus command, independently responds in the manner described with regard to FIGS. 3A-3C and 4A-4C. For example, in a system having three processing agents PX1, PX2, and PX3, and PX1 issues an LDEX, such as at block 304 of FIG. 3A and also missed in PX1's cache, such as at block 306, the L2 cache and controller-1 106 would issue a read prefer exclusive command on the coherent bus. Both PX2 and PX3 subsystems would snoop the coherent bus and identify the read prefer exclusive command, and if the requested line is in both PX2's cache and PX3's cache, both PX2's and PX3's L2 cache and controller would check the state of the associated reservation granule and based on determined state values of the RG and cache line state would proceed to an appropriate block 348, 350, 356, or 358. In such a case with each cache controller having data to provide to the PX1 sub system, appropriate means are provided by a protocol on the coherent bus to choose whether the controller for PX2 or the controller for PX3 provides the data to the PX1 subsystem.

Figure 5:
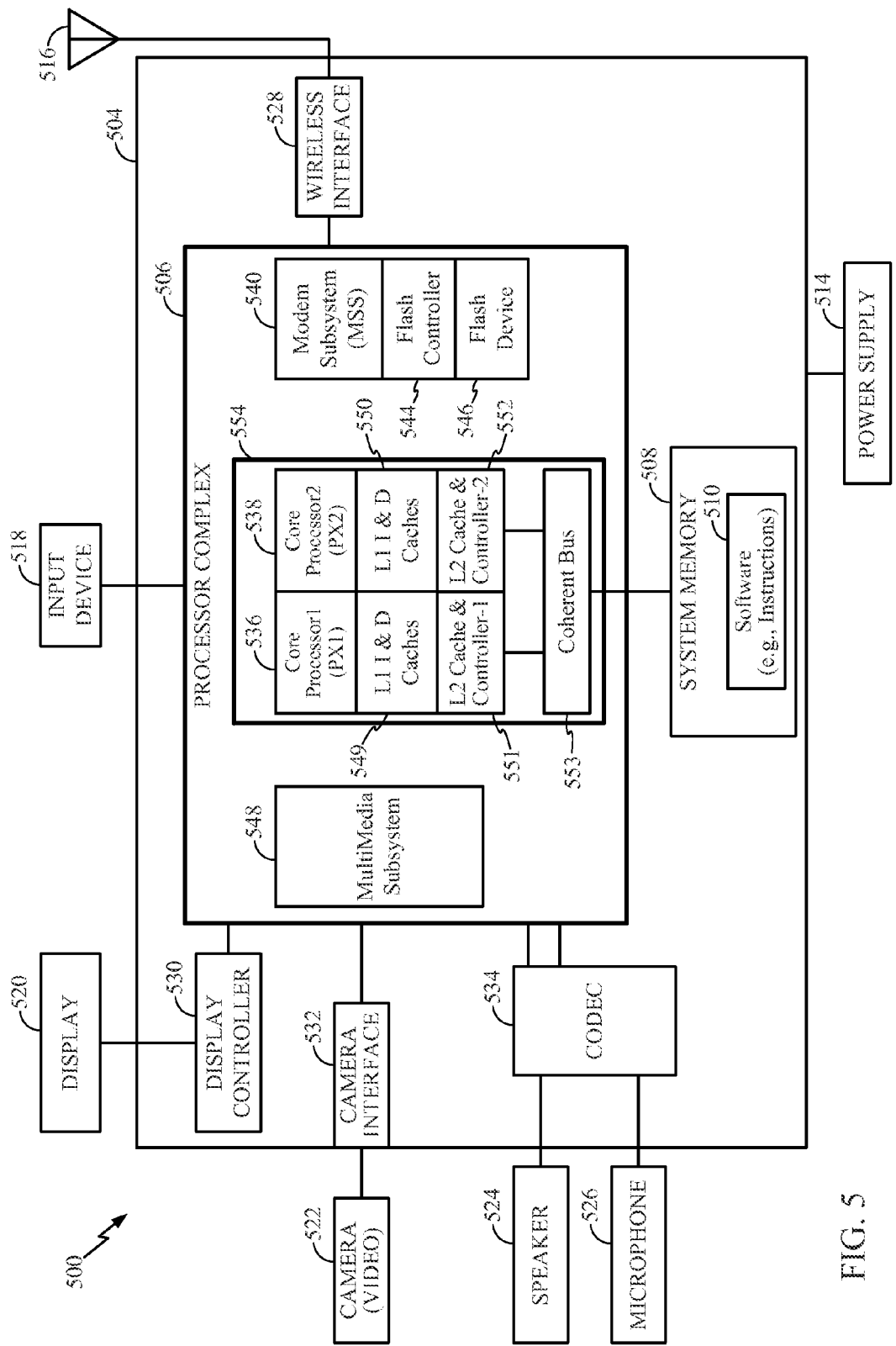
FIG. 5 illustrates a particular embodiment of a portable device that utilizes an exemplary semaphore management with efficient live-lock avoidance in accordance with embodiments of the invention.

FIG. 5 illustrates a particular embodiment of a portable device 500 that utilizes an exemplary semaphore management with efficient live-lock avoidance in accordance with embodiments of the invention. The portable device 500 may be a wireless electronic device and include a system core 504 which includes a processor complex 506 coupled to a system memory 508 having software instructions 510. The portable device 500 comprises a power supply 514, an antenna 516, an input device 518, such as a keyboard, a display 520, such as a liquid crystal display LCD, one or two cameras 522 with video capability, a speaker 524 and a microphone 526. The system core 504 also includes a wireless interface 528, a display controller 530, a camera interface 532, and a codec 534. The processor complex 506 may include a multi-processor (MP) system 554 which includes two core processing units, PX1 536 having local level 1 instruction and data (L1 I & D) caches 549 and PX2 538 having local level 1 instruction and data (L1 I & D) caches 550. The MP system 554 may correspond to the dual core system 102 of FIG. 1. The processor complex 506 may also include a modem subsystem 540, a flash controller 544, a flash device 546, a multimedia subsystem 548, a level 2 cache0 and controller0 551, a level 2 cache1 and controller1 552, and a coherent bus 553. The flash device 546 may include a removable flash memory or may also be an embedded memory.

In an illustrative example, the system core 504 operates in accordance with any of the embodiments illustrated in or associated with FIGS. 1, 3A-3C, and 4A-4C. For example, as shown in FIG. 5, the MP system 554 dual core processors are configured to access data or program instructions stored in the memories of the L1 I & D caches 549 and 550 of their associated dual core processor, the L2 caches 551 and 552, and in the system memory 508 to provide operations as illustrated in FIGS. 3A-3C.

The wireless interface 528 may be coupled to the processor complex 506 and to the wireless antenna 516 such that wireless data received via the antenna 516 and wireless interface 528 can be provided to the MSS 540 and shared with MP system 554. The camera interface 532 is coupled to the processor complex 506 and also coupled to one or more cameras, such as a camera 522 with video capability. The display controller 530 is coupled to the processor complex 506 and to the display device 520. The coder/decoder (codec) 534 is also coupled to the processor complex 506. The speaker 524, which may comprise a pair of stereo speakers, and the microphone 526 are coupled to the codec 534. The peripheral devices and their associated interfaces are exemplary and not limited in quantity or in capacity. For example, the input device 518 may include a universal serial bus (USB) interface or the like, a QWERTY style keyboard, an alphanumeric keyboard, and a numeric pad which may be implemented individually in a particular device or in combination in a different device.

The MP system 554 dual processors are configured to execute software instructions 510 that are stored in a non-transitory computer-readable medium, such as associated with the system memory 508, and that are executable to cause a computer, such as the dual core processors 536 and 538, to execute a program to provide operations as illustrated in FIGS. 3A-3C and 4A-4C. The PX1 536 and PX2 538 are configured to execute the software instructions 510 that are accessed from the different levels of cache memories and the system memory 508.

In a particular embodiment, the system core 504 is physically organized in a system-in-package or on a system-on-chip device. In a particular embodiment, the system core 504, organized as a system-on-chip device, is physically coupled, as illustrated in FIG. 5, to the power supply 514, the wireless antenna 516, the input device 518, the display device 520, the camera or cameras 522, the speaker 524, the microphone 526, and may be coupled to a removable flash device 546.

The portable device 500 in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, tablets, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The dual core processors 536 and 538 of FIG. 5 may be configured to execute instructions to service a real time task under control of a program. The program stored on a computer readable non-transitory storage medium either directly associated locally with processor complex 506, such as may be available through the instruction and data caches 549-552, or accessible through a particular input device 518 or the wireless interface 528. The input device 518 or the wireless interface 528, for example, also may access data residing in a memory device either directly associated locally with the processors, such as the processor local data caches, or accessible from the system memory 508. The methods described in connection with various embodiments disclosed herein may be embodied directly in hardware, in a software module having one or more programs executed by a processor, or in a combination of the two. A software module may reside in random access memory (RAM), dynamic random access memory (DRAM), synchronous dynamic random access memory (SDRAM), flash memory, read only memory (ROM), erasable programmable read only memory (EPROM), electrically erasable programmable read only memory (EEPROM), hard disk, a removable disk, a compact disk (CD)-ROM, a digital video disk (DVD) or any other form of non-transitory storage medium known in the art. A non-transitory storage medium may be coupled to the processor such that the processor can read information from, and write information to, the storage medium. In the alternative, the storage medium may be integral to the processor.

While the invention is disclosed in the context of illustrative embodiments for use in processor systems, it will be recognized that a wide variety of implementations may be employed by persons of ordinary skill in the art consistent with the above discussion and the claims which follow below. For example, a fixed function implementation may also utilize various embodiments of the present invention.

What is claimed is:

1. A method for semaphore management across a coherent bus in a multi-processor, comprising:
   determining that a first cache local to a first processor missed at a target address in response to a load exclusive instruction issued from the first processor;
   issuing a read prefer exclusive command on a coherent bus from the first cache to a second cache local to a second processor;
   determining, in response to the read prefer exclusive command, that a reservation granule in the second cache is in a not tagged state for the target address; and
   invalidating a cache line at the target address in the second cache in response to the determination that the reservation granule in the second cache is in the not tagged state for the target address.

2. The method of claim 1, further comprising:
   providing, to the first cache, data requested at the target address in response to the read prefer exclusive command snooped by the second cache from the coherent bus.

3. The method of claim 1, further comprising:
   providing, to the first cache, data requested at the target address from a next level memory above the first cache in a memory hierarchy in response to the read prefer exclusive command detected by snooping the coherent bus.

4. The method of claim 1, wherein a reservation granule in the first cache is tagged with the target address after the read prefer exclusive command has completed execution.

5. The method of claim 1, wherein the read prefer exclusive command operates as a hint to other caches in the multi-processor to give up the cache line if it is tagged as containing shared data.

6. The method of claim 1, further comprising:
   determining a state of the cache line in the second processor; and
   changing a state of the cache line received in the first processor to an exclusive state in response to the state of the cache line in the second processor being in a shared or exclusive state.

7. The method of claim 1, further comprising:
   determining a state of the cache line in the second processor; and
   changing a state of the cache line received in the first processor to a modified state in response to the state of the cache line in the second processor being in an owned or modified state.

8. An apparatus for semaphore management in a multi-processing system, comprising:
   a first cache controller configured to issue a read prefer exclusive command on a coherent bus from a first cache to a second cache in response to the first cache having a miss for data at a target address provided by a load exclusive instruction, wherein the first cache is coupled to a first processing agent that issued the load exclusive instruction and the second cache is coupled to a second processing agent; and
   a second cache controller configured to snoop the coherent bus and in response to a snooped read prefer exclusive command and a reservation granule in the second cache being tagged for the target address, ending a state of a cache line in the second cache at the target address in a valid and a shared state.

9. The apparatus of claim 8, wherein the data at the target address is provided to the first cache in response to the read prefer exclusive command snooped by the second cache controller from the coherent bus.

10. The apparatus of claim 8, wherein the data at the target address is provided to the first cache from a next level memory above the first cache in a memory hierarchy in response to the read prefer exclusive command detected by snooping the coherent bus.

11. The apparatus of claim 8, wherein the first cache controller is further configured to tag:
    a reservation granule in the first cache with the target address after the snooped read prefer exclusive command has completed execution.

12. The apparatus of claim 8, wherein the read prefer exclusive command operates as a hint to other caches in the multi-processing system to give up the cache line if it is tagged as containing shared data.

13. The apparatus of claim 8, wherein the first processing agent receives the data provided by the second cache controller and changes a state of a cache line of the first processing agent to a shared state.

14. A method for semaphore management across a coherent bus in a multi-processor, comprising:
    determining that a first cache local to a first processor hit at a target address in response to a load exclusive instruction issued from the first processor, wherein an accessed first cache line is in a shared or owned state;

issuing an upgrade prefer exclusive command on a coherent bus from the first cache to a second cache local to a second processor;

determining that the second cache hit at the target address in response to the upgrade prefer exclusive command, wherein a reservation granule of an accessed second cache line is in a not tagged state; and upgrading the first cache line requested by the first processor to an exclusive state in response to the second cache line being in a shared state.

15. The method of claim 14 further comprising:

invalidating the second cache line in the second cache in response to the second cache line initially being in the shared state.

16. The method of claim 14 further comprising:

upgrading the first cache line requested by the first processor to a modified state in response to the second cache line being in an owned state.

17. The method of claim 14 further comprising:

determining that the second cache hit at the target address in response to the upgrade prefer exclusive command and the reservation granule of the hit second cache line is tagged with a same target address as the first cache line requested by the first processor; and returning to monitor for further coherent bus commands without modifying a cache line state for the first cache and for the second cache.

18. The method of claim 14, wherein the upgrade prefer exclusive command is identified by a snoop unit in a cache controller for the second cache.

19. A computer readable non-transitory medium encoded with computer readable program data and code, the program data and code when executed operable to:

determine that a first cache local to a first processor missed at a target address in response to a load exclusive instruction issued from the first processor;

issue a read prefer exclusive command on a coherent bus from the first cache to a second cache local to a second processor; and invalidate a cache line at the target address in the second cache in response to a reservation granule in the second cache being in a not tagged state for the target address.

20. An apparatus for semaphore management in a multi-processing system, comprising:

means for issuing a read prefer exclusive command on a coherent bus from a first cache to a second cache in response to the first cache having a miss for data at a target address provided by a load exclusive instruction, wherein the first cache is coupled to a first processing agent that issued the load exclusive instruction and the second cache is coupled to a second processing agent; and means for snooping the coherent bus and in response to a snooped read prefer exclusive command and a reservation granule in the second cache being tagged for the target address, means for ending a state of a cache line in the second cache at the target address in a valid and shared state.

* * * * *